Sept. 22, 1942.   W. N. DE SHERBININ   2,296,272
FILM FILE
Filed Nov. 6, 1940   2 Sheets-Sheet 1
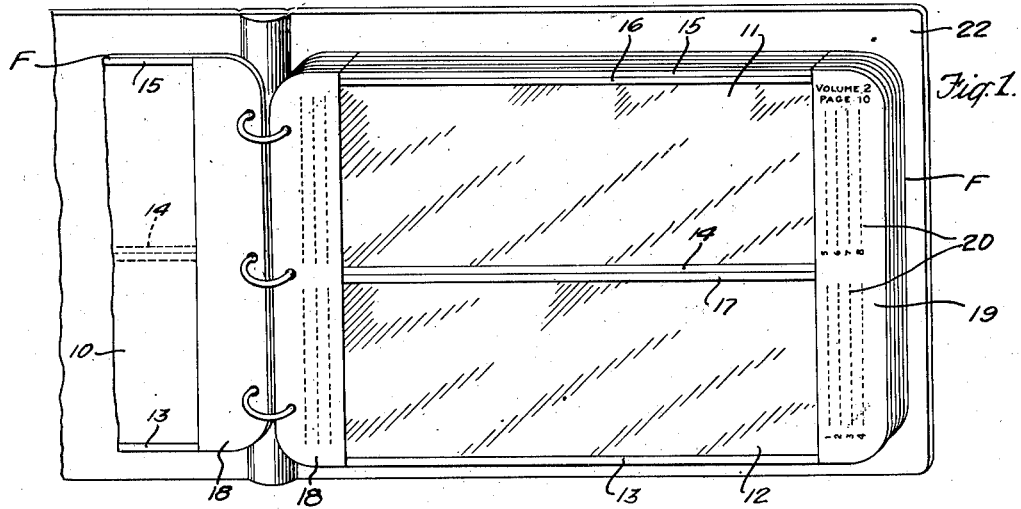
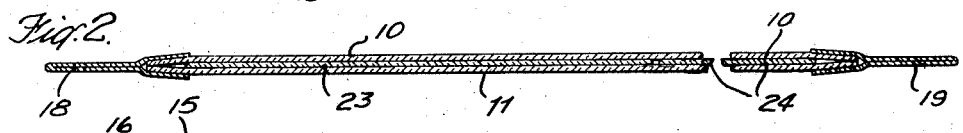
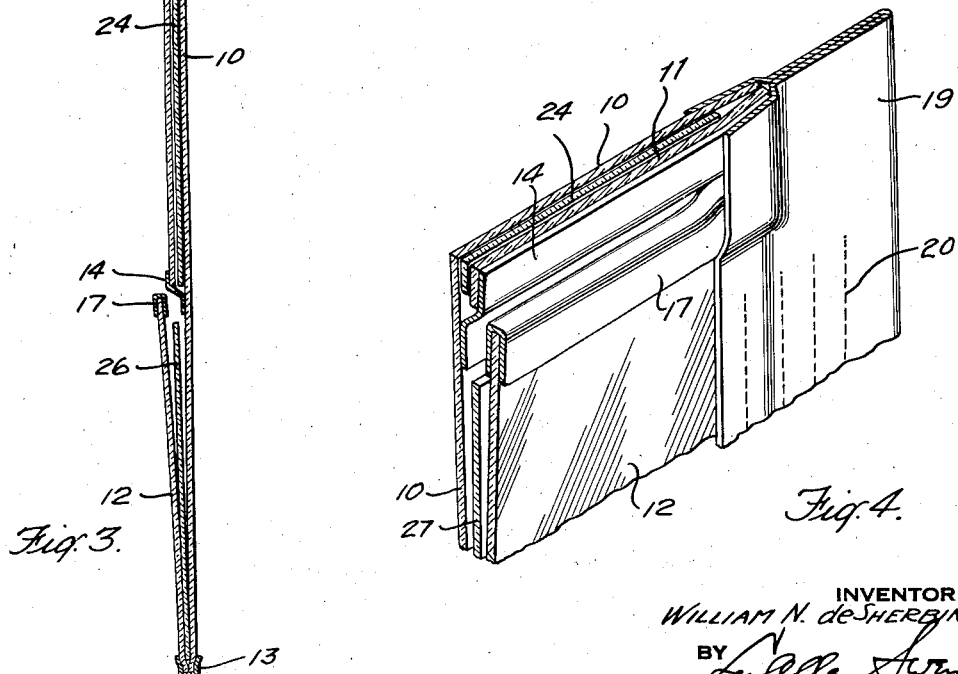
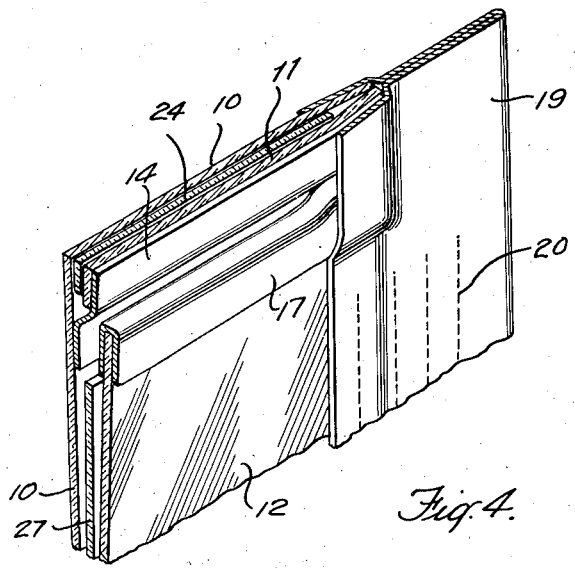
INVENTOR
WILLIAM N. deSHERBININ
BY
ATTORNEY

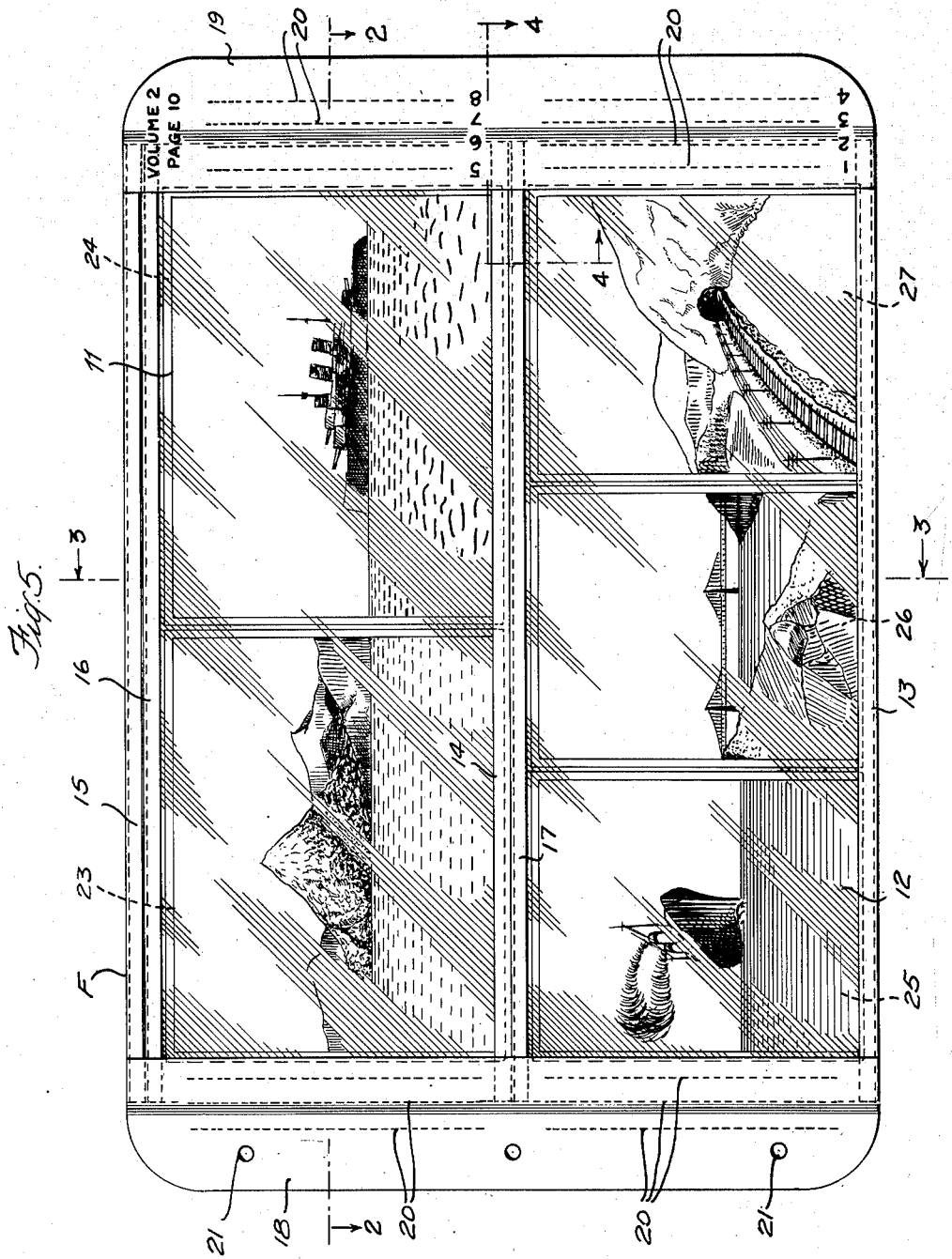

Patented Sept. 22, 1942

2,296,272

UNITED STATES PATENT OFFICE 2,296,272

FILM FILE

William N. de Sherbinin, Mount Kisco, N. Y.

Application November 6, 1940, Serial No. 364,586

3 Claims. (Cl. 129—20)

This invention relates to photography and projection.

The invention provides novel means for filing photographic films after they have been exposed and developed, the filing means being so arranged that the films may be displayed readily and easily and any desired film may be located quickly and withdrawn from the file without the necessity of touching or handling any other films. The invention is particularly well adapted to the filing and display of colored films, but it is not limited thereto.

The invention will be understood from the following description when considered in connection with the accompanying drawings forming a part thereof, and in which:

Fig. 1 is a perspective view of film files embodying the invention, the files being mounted in a loose-leaf binder;

Fig. 2 is a longitudinal sectional view on an enlarged scale, of one of the files, taken on line 2—2 of Fig. 5;

Fig. 3 is a transverse sectional view of one of the files, taken on line 3—3 of Fig. 5;

Fig. 4 is a sectional view taken on line 4—4 of Fig. 5, and

Fig. 5 is an elevational view of one of the files.

Like characters of reference refer to the same parts throughout the several views.

Referring to the drawings, the form of the file F illustrated, includes a backing member 10 of suitable light transmitting and diffusing material, such as acetate sheeting with a matte finish on one side, a frosted gelatinous material, frosted Cellophane or Celluloid, a light diffusing paper, or plastic material having one or both faces ground. A plurality of film pockets are provided, two as shown, with the backing member, by transparent strips 11 and 12 of any suitable material, such as a clear acetate sheeting or clear gelatinous or plastic material, or clear Celluloid or Cellophane, which extend longitudinally of the backing member parallel to each other. The width of the strips 11 and 12 is somewhat less than half the width of the backing member. The lower edge portion of the lower strip 12 is secured to the lower edge portion of the backing member 10 by a strip of suitable material 13 such as a fibre tape with a rubber base cement on one side, which is cemented over the lower edge portion of the strip and member as shown in Fig. 3. The lower edge portion of the upper strip is secured to the intermediate portion of the backing member, just above the upper edge of the lower strip, by a strip of suitable material 14 like strip 13. The upper edge of the backing member 10 is bound by a strip of suitable material 15 like strip 13, which is cemented onto the upper edge portion of the backing member, and the upper edge portions of the strips 11 and 12 are similarly bound by strips of material 16 and 17 respectively.

The side portions of the backing member 10 and the adjacent end portions of the strips 11 and 12, are bound by strips of an opaque material, such as cardboard or the like 18 and 19, each of which is folded in the middle, with one free edge cemented or glued to the end portion of the backing member 10, the other free edge cemented or glued to the end portions of the strips 11 and 12, and with the portions of the cardboard which are adjacent each other and which extend beyond the backing member, cemented or glued together. The strips 18 and 19 are cut or formed to provide rounded edges for the file. Spaced lines 20 are printed on the front faces of the strips 18 and 19 for identifying data for the films placed in the file, and some of these lines are numbered, as shown, for ready reference purposes. The strip 18 at the left hand end of the file as viewed in Fig. 5, is provided with apertures 21 to permit the file to be placed in a loose-leaf binder 22 of any suitable type such as shown in Fig. 1.

The files F may be of any convenient size and may have one, or more than two pockets, if desired. A convenient size of the type of file illustrated is about eight and a half (8½) inches wide and thirteen (13) inches long, with about ten (10) inches between the cardboard strips 18 and 19, and with the strips 18 and 19 each about one and a half (1½) inches wide. Each pocket will receive two films 4 x 5 inches, designated 23 and 24, or three films 3¼ x 4¼ inches, designated 25, 26 and 27.

From the foregoing it will be perceived that with film files embodying the invention, films can be preserved in such manner that they are readily accessible and they may be displayed without removing them from their files, simply by placing the files in position so that light, either natural or artificial, may shine through the file and the films therein. As previously mentioned, the files are particularly well adapted to the filing and display of colored film, although their use is not limited thereto. In lieu of placing the files in a loose-leaf type of binder, they may be filed in any suitable or desirable place or device, such as a box file or the like.

Changes may be made in the shape and size of the file disclosed and in the materials of the several parts without departing from the invention. For example, the backing member may be of clear or transparent material rather than of light diffusing material, and the edges of the file and pockets need not be taped or bound as shown. The pockets may be divided into a plurality of sections if desired, so arranged that one section will receive one film. Other material than that disclosed may be employed for binding the edges of the file and the pockets, such as fabric, paper, or the same material utilized for the backing member or the pockets. The strips 11 and 12 may be secured to the backing member by any suitable means, such as by cementing the lower edge portions to the backing member. Other means may be employed for securing the several parts together, such as clips or the like. Other changes will suggest themselves to those skilled in the art. In view thereof, it will be understood that the invention is not to be limited excepting by the scope of the appended claims.

What is claimed is:

1. A film file comprising a backing member of light transmitting and diffusing material, two strips of transparent material of substantially the same length and of about half the width of the backing member disposed adjacent the backing member and side by side in non-overlapping relationship, a relatively narrow strip of material extending along the peripheral portion of one side of one strip and the peripheral portion of one side of the backing member and being secured adhesively to the strip and backing member, another relatively narrow strip of material extending along the peripheral portion of the corresponding side of the other strip and the central portion of the backing member and being secured thereto adhesively, and strips of opaque material for securing the end portions of the strips of transparent material to the corresponding end portions of the backing member to provide a plurality of pockets for films, each strip of opaque material being folded upon itself and having the inner side of one free edge portion secured adhesively to the outer sides of the end portions of the strips of transparent material and having the inner side of the other free edge portion secured adhesively to the outer side of the corresponding end portion of the backing member, parts of the strips of opaque material extending beyond the ends of the backing member and the strips of transparent material and being secured together adhesively.

2. A film file comprising a backing member of light transmitting and diffusing material, two strips of transparent material of substantially the same length and of about half the width of the backing member disposed adjacent the backing member and side by side in non-overlapping relationship, a narrow strip of material for securing a side portion of one strip to a side portion of the backing member, another narrow strip of material for securing a side portion of the other strip to the central portion of the backing member, and opaque material for securing the end portions of the strips to the end portions of the backing member to provide a plurality of pockets for films, the opaque material extending beyond the ends of the backing member.

3. A film file comprising a backing member of light transmitting and diffusing material, two strips of transparent material of substantially the same length and of about half the width of the backing member disposed adjacent the backing member and side by side in non-overlapping relationship, a narrow strip of material for securing a side portion of one strip to a side portion of the backing member, another narrow strip of material for securing a side portion of the other strip to the central portion of the backing member, opaque material for securing the end portions of the strips to the end portions of the backing member to provide a plurality of pockets for films, the opaque material extending beyond the end of the backing member, binding material for the free edge of each strip, and binding material for the other side portion of the backing member.

WILLIAM N. DE SHERBININ.